(12) United States Patent
Yan et al.

(10) Patent No.: US 9,130,634 B2
(45) Date of Patent: Sep. 8, 2015

(54) DIGITAL ANTENNA SWITCHING

(71) Applicant: QUALCOMM Incorporated, San Diego, CA (US)

(72) Inventors: Hongbo Yan, Vista, CA (US); Francis M. Ngai, Louisville, CO (US); Jafar Mohseni, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/015,202

(22) Filed: Aug. 30, 2013

(65) Prior Publication Data

US 2015/0063431 A1 Mar. 5, 2015

(51) Int. Cl.
| | |
|---|---|
| H04B 1/38 | (2015.01) |
| H04L 5/16 | (2006.01) |
| H04B 7/08 | (2006.01) |
| H04B 7/06 | (2006.01) |

(52) U.S. Cl.
CPC ............ *H04B 7/0802* (2013.01); *H04B 7/0602* (2013.01); *H04B 7/0805* (2013.01); *H04B 7/0817* (2013.01)

(58) Field of Classification Search
CPC ...... H04M 11/06; H04M 11/062; H04B 1/40; H04B 3/23; H04L 1/0618; H04L 1/06; H04L 27/2647
USPC .......................................... 375/222, 267.347
See application file for complete search history.

(56) References Cited

U.S. PATENT DOCUMENTS

| | | | |
|---|---|---|---|
| 6,009,130 A | 12/1999 | Lurey et al. | |
| 6,055,230 A | 4/2000 | Feuerstein et al. | |
| 7,155,654 B2 | 12/2006 | Chien et al. | |
| 7,305,222 B2 | 12/2007 | Khorram | |
| 7,522,569 B2 | 4/2009 | Rada et al. | |
| 7,865,166 B2* | 1/2011 | Kanahashi | 455/337 |
| 2007/0111692 A1* | 5/2007 | Kuramoto et al. | 455/277.1 |
| 2009/0034475 A1 | 2/2009 | Runyon et al. | |
| 2010/0195753 A1* | 8/2010 | Yamamoto et al. | 375/267 |
| 2013/0102316 A1 | 4/2013 | Ngai et al. | |

FOREIGN PATENT DOCUMENTS

EP 2139244 A1 12/2009

OTHER PUBLICATIONS

International Search Report and Written Opinion—PCT/US2014/053303—ISA/EPO—Nov. 6, 2014.

* cited by examiner

*Primary Examiner* — Ted Wang
(74) *Attorney, Agent, or Firm* — The Marbury Law Group, PLLC

(57) ABSTRACT

Systems and methods for antenna switching without using a radio-frequency switch are provided. A signal received via a first antenna is digitized to form a first digital received signal. A signal received via a second antenna is digitized to form a second digital received signal. A switch selects the first digital received signal or the second digital received signal to be supplied to a modem to be demodulated. The switch may also supply a digital transmit signal from the modem to be supplied to digital-to-analog converters to and then transmitted using the first or second antenna. Additionally, when the modem is demodulating the signal received via the first antenna, another modem may be demodulating the signal received via the second antenna and vice versa.

17 Claims, 5 Drawing Sheets

Before Switching

Before Switching

After Switching

Before Switching

After Switching

DIGITAL ANTENNA SWITCHING

BACKGROUND

1. Field

Aspects of the present disclosure relate generally to wireless communication and, more particularly, to antenna switching in a wireless terminal.

2. Background

A wireless terminal, for example, a mobile phone, may include multiple antennas. The communication channels to and from the antennas can vary greatly. For example, when a user holds a mobile phone, one antenna may be blocked by the user's band while another antenna is substantially open. When the mobile phone uses the blocked antenna for communications, there may be, for example, a 10-30 dB attenuation relative to when the unblocked antenna is used. Thus, a wireless terminal may improve performance by switching the antenna that is used away from a blocked antenna. A wireless terminal may also provide concurrent communications for two protocols. The communication channels for the protocols may differ (for example, with proximity to respective base stations) in such a way that one allocation of antennas provides reliable communication for both protocols but when the antennas are switched, reliable communication for one of the protocols is not achieved.

Antenna switching can be performed using radio frequency (RF) switches. The use of RF switches causes an insertion loss, for example, 0.5 dB on signals that pass through the RF switches. RF switches can also impair signals in other ways, for example, nonlinearities and intermodulation. Additionally, providing the RF switch can be expensive and occupy valuable physical space in a wireless terminal.

SUMMARY

Systems and methods that perform antenna switching without the use of a radio frequency switch are provided. The apparatuses and methods can be used in wireless user equipment such as mobile phones. The apparatuses and methods can provide improved performance and reduced complexity.

In one aspect, a circuit for switching antennas in a wireless terminal is provided. The circuit comprises a first analog-to-digital converter configured to convert a first analog received signal to a first digital received signal; a second analog-to-digital converter configured to convert a second analog received signal to a second digital received signal; a first modem module configured to demodulate a first input signal; and a digital switch configured to supply the first digital received signal to the first modem module as the first input signal in a first state and to supply the second digital received signal to the first modem module as the first input signal in a second state.

In one aspect, a method for switching antennas in a wireless terminal is provided. The method comprises digitizing a first analog received signal to produce a first digital received signal; digitizing a second analog received signal to produce a second digital received signal; switching from a first state to a second state, the first digital received signal supplied as a first input signal in the first state, and the second digital received signal supplied as the first input signal in the second state; and demodulating the first input signal.

In one aspect, a circuit for switching antennas in a wireless terminal is provided. The circuit comprises a means for converting a first analog received signal to a first digital received signal; a means for converging a second analog received signal to a second digital received signal; a means for demodulating a first input signal; and a means for switching between supplying the first digital received signal as the first input signal in a first state and supplying the second digital received signal as the first input signal in a second state Other features and advantages of the present invention should be apparent from the following description which illustrates, by way of example, aspects of the invention.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Figure 1:
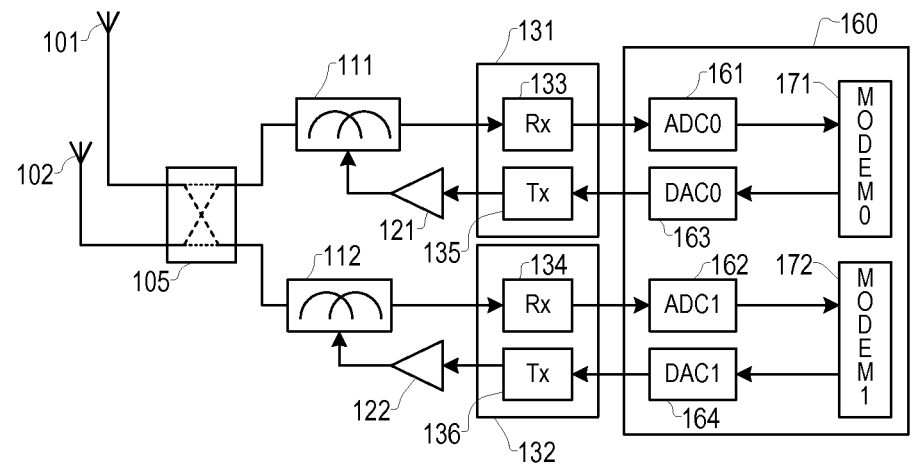
FIG. 1 is a functional block diagram of a wireless terminal.

FIG. 1 is a functional block diagram of a wireless terminal. The wireless terminal includes a first antenna 101 and a second antenna 102. The first antenna 101 and the second antenna 102 are coupled to a radio frequency (RF) switch 105. The RF switch 105 in the embodiment of FIG. 1 is a double-pole double-throw switch. Other types of switches may also be used, for example, depending on the number of antennas and number of radio channels. The RF switch 105 can couple the first antenna 101 to a first duplexer 111 and the second antenna 102 to a second duplexer 112, or the RF switch 105 can be switched to couple the first antenna 101 to the second duplexer 112 and the second antenna 102 to the first duplexer 111. The duplexers couple separate transmit and receive signals to the antennas.

The duplexers receive the transmit signals from RF power amplifiers 121, 122. The RF power amplifiers are coupled to RF transmitter circuits 135, 136. The RF transmitter circuits provide functions for transmitting signals from the wireless terminal, such as up conversion. The duplexers supply the received signals to RF receiver circuits 133, 134. The RF receiver circuits provide functions for receiving signals, such as down conversion. The RF transmitter circuits and RF receiver circuits may be provided by transceiver modules 131, 132.

The RF receiver circuits supply signals to analog-to-digital converters (ADCs) 161, 162. The signals received by the ADCs may be, for example, baseband or intermediate-frequency (IF) signals corresponding to signals received by the antennas. The ADCs convert the received analog signals to digital signals and provide the digital signals to modem modules 171, 172 that operate to recover digital information in the received signal.

The RF transmitter circuits receive signals from the digital-to-analog converters (DACs) 163, 164. The signals supplied by the DACs may be, for example, baseband or IF signals corresponding to signals to be transmitted by the antennas. The DACs receive digital transmit signals from the modem modules 171, 172 and convert the digital transmit signal to analog transmit signals. The modem modules 171, 172 produce the digital transmit signals by converting information to be transmitted from the wireless terminal into appropriate formats far transmission. The ADCs, DACs, and modem modules may be combined with other circuits, such as processors, in a system-on-a-chip 160.

The RF switch 105 causes an insertion loss, for example, 0.5 dB on the signals that pass through it. The RF switch 105 can also impair signals in other ways, for example, nonlinearities and intermodulation. Additionally, the RF switch 105 can be expensive and occupy valuable physical space in the wireless terminal.

Figure 2:
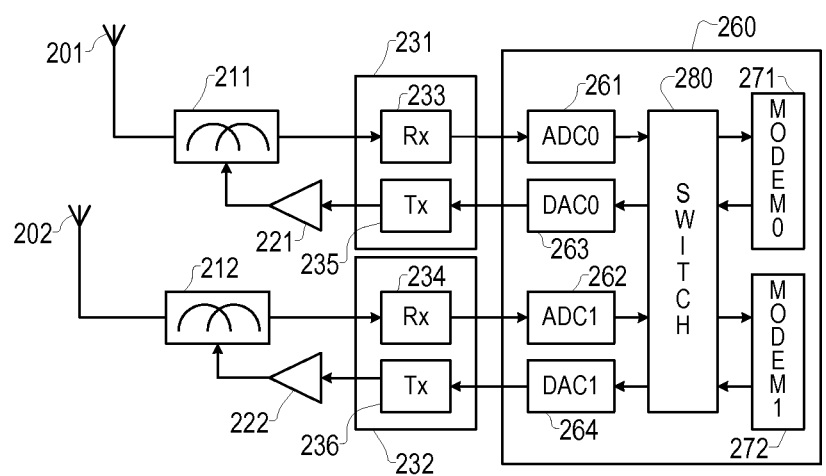
FIG. 2 is a functional block diagram of a wireless terminal according, to a presently disclosed embodiment.
Figure 3:
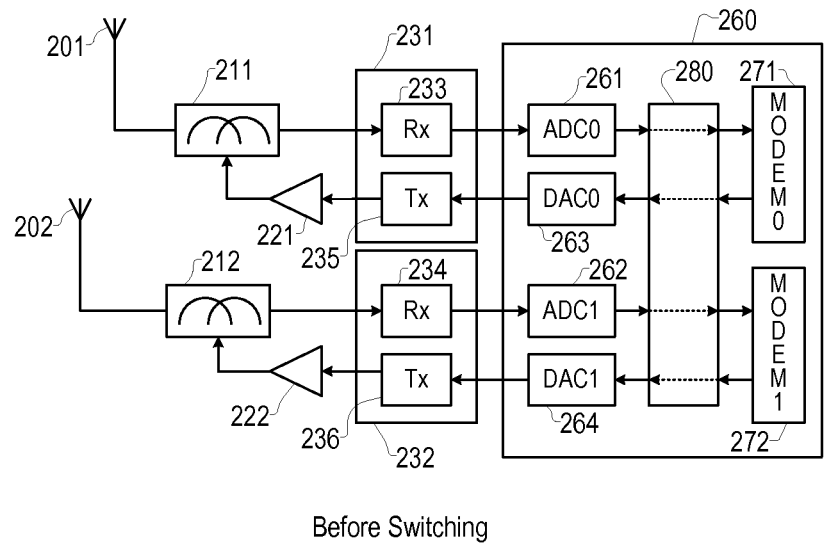
FIGS. 3 and 4 are functional block diagrams that illustrate operation of the wireless terminal of FIG. 2.
Figure 4:
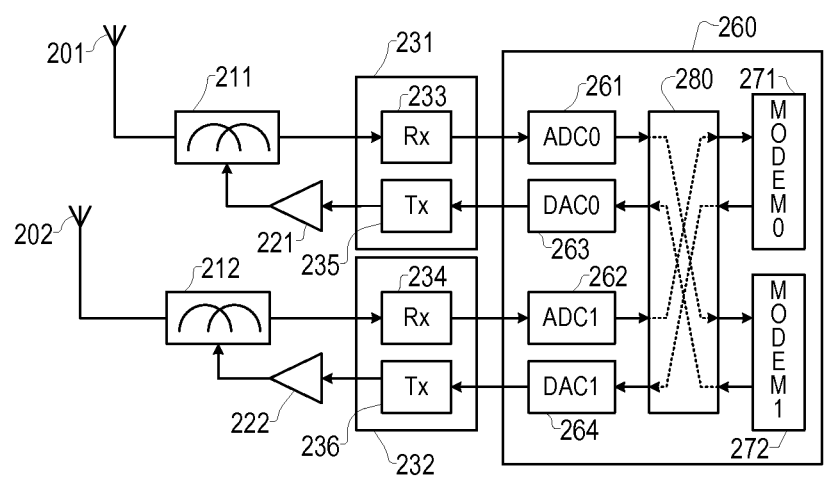

FIG. 2 is a functional block diagram of a wireless terminal according to a presently disclosed embodiment. The wireless terminal includes a first antenna 201 and a second antenna 202. FIGS. 3 and 4 illustrate operation of the wireless terminal of FIG. 2. FIG. 4 illustrates operation of the wireless terminal with the antennas swapped relative to the operation of the wireless terminal illustrated in FIG. 3.

The wireless terminal of FIG. 2 is similar to the wireless terminal of FIG. 1; however, the wireless terminal of FIG. 2 switches antennas without an RF switch. The first antenna 201 is coupled to a first duplexer 211 and the second antenna 202 is coupled to a second duplexer 212. The duplexers couple separate transmit and receive signals to the respective antennas. In an embodiment, single-pole double throw switches may replace the duplexers, for example, in time-division duplex systems.

The duplexers receive the transmit signals from RF power amplifiers 221, 222. The RF power amplifiers are coupled to RF transmitter circuits 235, 236. The RF transmitter circuits provide functions for transmitting signals from the wireless terminal, such as up conversion. The duplexers supply the received signals to RF receiver circuits 233, 234. The RF receiver circuits provide functions for receiving signals, such as down conversion. The RF transmitter circuits and RF receiver circuits may be provided by transceiver modules 231, 232.

The RF receiver circuits supply signals to analog-to-digital converters (ADCs) 261, 262. The signals received by the ADCs may be, for example, baseband or IF signals corresponding to signals received by the antennas.

The RF transmitter circuits receive signals from digital-to-analog converters (DACs) 263, 264. The signals supplied by the DACs may be, for example, baseband or IF signals corresponding to signals to be transmitted by the antennas.

Outputs of the ADCs 261, 262 are coupled via a digital switch 280 to modem modules 271, 272. Inputs to the DACs are also coupled via the digital switch 280 to the modem modules 271, 272. The modem modules operate to recover digital information in the received signals and to convert information to be transmitted from the wireless terminal into appropriate formats for transmission. The recovery of digital information from a received signal can be referred to as demodulating the signal, and the conversion of information to be transmitted into an appropriate format can be referred to as modulating the information. The modem modules, in an embodiment, operate based on different communication protocols. The signals coupled between the ADCs and DACs and the modem modules are digital signals. The ADCs, DACs, digital switch, and modem modules may be combined with other circuits, such as processors, in a system-on-a-chip 260.

The digital switch 280 can be configured (or controlled) to select how the DACs and ADCs are coupled to the modem modules. The digital switch 280 may be configured, for example, by a processor or other control circuit. FIGS. 3 and 4 illustrate two configurations of the digital switch 280.

When the wireless terminal operates as illustrated in FIG. 3, the digital switch 280, for example, in a first state, couples the first ADC 261 and the first DAC 263 to the first modem module 271 and the second ADC 262 and the second DAC 264 to the second modem module 272. In this state, the digital switch 280 supplies a digital received signal from the first ADC 261 to the first modem module 271, supplies a digital received signal from the second ADC 262 to the second modem module 272, supplies an output signal from the first modem module 271 to the first DAC 263, and supplies an output signal from the second modem module 272 to the second DAC 264. Accordingly, the first modem module 271 processes signals received or transmitted by the first antenna 201 and the second modem module 272 processes signals received or transmitted by the second antenna 202.

When the wireless terminal operates as illustrated in FIG. 4, the digital switch 280, for example, in a second state, couples the first ADC 261 and the first DAC 263 to the second modem module 272 and the second ADC 262 and the second DAC 264 to the first modem module 271. In this state, the digital switch 280 supplies a digital received signal from the second ADC 262 to the first modem module 271, supplies a digital received signal from the first ADC 261 to the second modem module 272, supplies an output signal from the first modem module 271 to second DAC 264, and supplies an output signal from the second modem module 272 to the first DAC 263. Accordingly, the first modem module 271 processes signals received or transmitted by the second antenna 202 and the second modern module 272 processes signals received or transmitted by the first antenna 201.

The coupling of the DACs and ADCs to the selected modem may be accomplished using multiplexers, selectors, or other digital circuits. This is in contrast to the wireless terminal of FIG. 1 where antenna switching is performed on RF signals. In addition to eliminating the RF switch, the wireless terminal of FIG. 2 can improve communication performance by removing attenuation and distortion associated with the RF switch.

Figure 5:
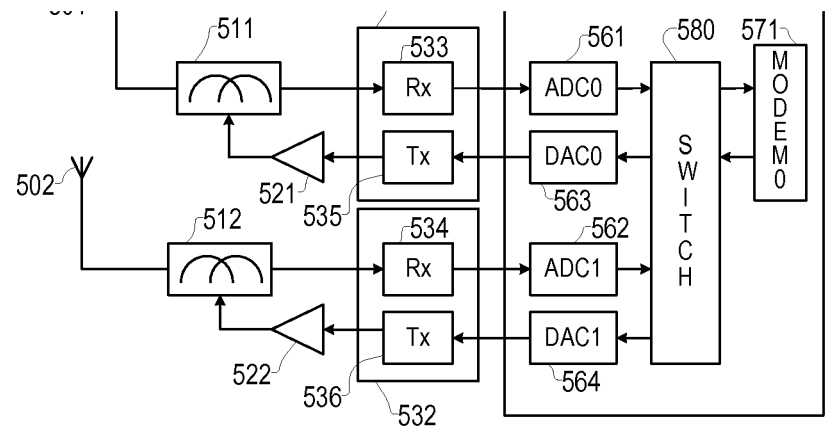
FIG. 5 is a functional block diagram of another wireless terminal according to a presently disclosed embodiment.
Figure 6:
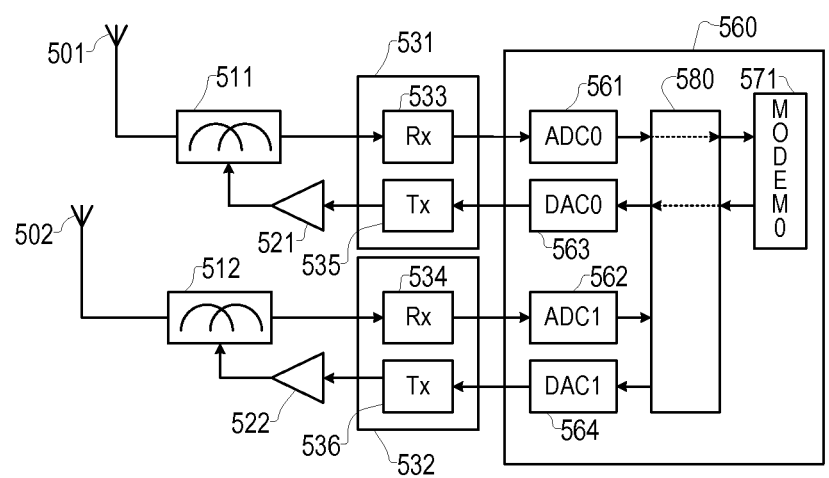
FIGS. 6 and 7 are functional block diagrams that illustrate operation of the wireless terminal of FIG. 5.
Figure 7:
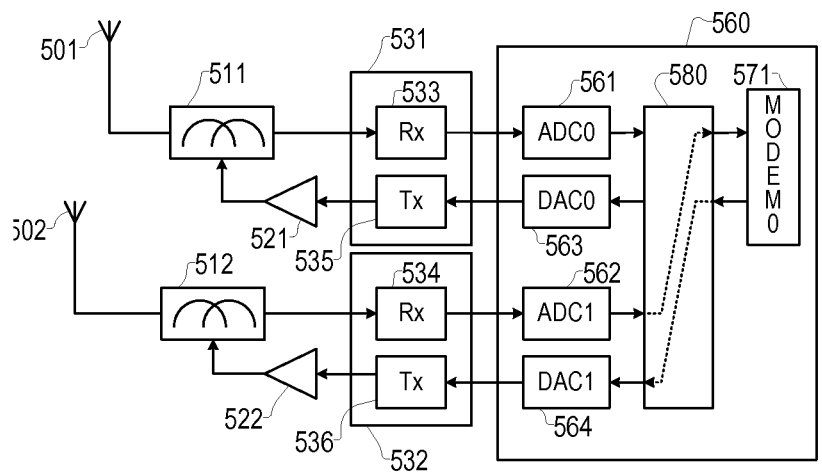

FIG. 5 is a functional block diagram of another wireless terminal according to a presently disclosed embodiment. FIGS. 6 and 7 illustrate operation of the wireless terminal of FIG. 5. FIG. 6 illustrates operation of the wireless terminal with the antennas switched relative to the operation of the wireless terminal illustrated in FIG. 5.

The wireless terminal of FIG. 5 is similar to the wireless terminal of FIG. 2 with its functional elements operating as described in connection with FIG. 2 unless otherwise noted. Accordingly the description will be brief with emphasis on differences. In contrast to the wireless terminal of FIG. 2, the wireless terminal of FIG. 5 includes only one modem. It should be noted that, in an embodiment, the wireless terminal of FIG. 2 may be used with only one of the modem modules 271, 272 operating.

In the wireless terminal of FIG. 5, a first antenna 501 is coupled to a first duplexer 511 and a second antenna 502 is coupled to a second duplexer 512. The duplexers receive transmit signals from RF power amplifiers 521, 522. The RF power amplifiers are coupled to RF transmitter circuits 535, 536. The duplexers supply received signals to RF receiver circuits 533, 534. The RF transmitter circuits and RF receiver circuits may be provided by transceiver modules 531, 532.

The RF receiver circuits supply analog received signals to analog-to-digital converters (ADCs) 561, 562. The RF transmitter circuits receive analog transmit signals from digital-to-analog converters (DACs) 563, 564.

Outputs of the ADCs 561, 562 can be coupled to a modem module 571 via a digital switch 580. Inputs to the DACs can also be coupled to the modem module 571 via the digital switch 580. The signals coupled between the ADCs and DACs and the modem module are digital signals. The ADCs, DACs, digital switch, and modem module may be combined with other circuits, such as processors, in a system-on-a-chip 560.

The digital switch 580 can be configured (or controlled) to select which of the DACs and which of the ADCs are coupled to the modem module. The digital switch 580 may be configured, for example, by a processor or other control circuit. FIGS. 6 and 7 illustrate two configurations of the digital switch 580.

When the wireless terminal operates as illustrated in FIG. 6, the digital switch 580, for example, in a first state, couples the first ADC 561 and the first DAC 563 to the modem module 571. In this state, the digital switch 580 supplies a digital received signal from the first ADC 561 to the modem module 571 and supplies an output signal from the modem module 571 to the first DAC 563. Accordingly, the modem module 571 processes signals received or transmitted by the first antenna 501. The second ADC 562 and the second DAC 564 may, in an embodiment, be disabled or powered down.

When the wireless terminal operates as illustrated in FIG. 7, the digital switch 580, for example, in a second state, couples the second ADC 562 and the second DAC 564 to the modem module 571. In this state, the digital switch 580 supplies a digital received signal from the second ADC 562 to the modem module 571 and supplies an output signal from the modem module 571 to the second DAC 564. Accordingly, the modem module 571 processes signals received or transmitted by the second antenna 502. The first ADC 561 and the first DAC 563 may, in an embodiment, be disabled or powered down.

The coupling of the DACs and ADCs to the modem module may be accomplished using multiplexers, selectors, bus drivers, or other digital circuits. This is in contrast to the wireless terminal of FIG. 1 where antenna switching is performed on RF signals. In addition to eliminating the RF switch, the wireless terminal of FIG. 5 can improve communication performance by removing attenuation and distortion associated with the RF switch.

Figure 8:
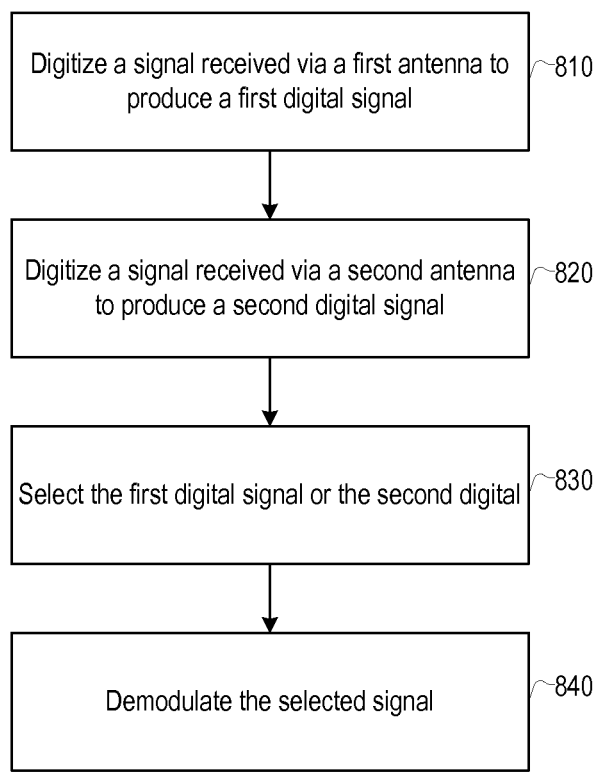
FIG. 8 a flowchart illustrating a method for antenna switching according to a presently disclosed embodiment.

FIG. 8 is a flowchart illustrating a method for antenna switching according to a presently disclosed embodiment. The method may be performed, for example, by one of the wireless terminals described above. To provide a specific example, aspects of the method will be described with reference to the wireless terminal of FIG. 5.

In step 810, a signal received via a first antenna is digitized to produce a first digital signal. For example, a signal received with the first antenna 501 may be digitized by the first ADC 561. Similarly, a transmit, signal may be converted from digital to analog form for transmission via the first antenna.

In step 820, a signal received via a second antenna is digitized to produce a second digital signal. For example, a signal received with the second antenna 502 may be digitized by the second ADC 562. Similarly, a transmit signal may be converted from digital to analog form for transmission via the second antenna. In various embodiments, the digitization of the signal received via the first antenna performed in step 810 may cease, continue, or temporarily continue in step 820.

In step 830, a selection of the first digital signal or the second digital signal is performed. For example, the digital switch 580 may select the output of the first ADC 561 or the second ADC 562. Similarly, the digital switch 580 may supply a transmit signal to the first DAC 563 or the second DAC 564.

In step 840, the signal selected in step 830 is demodulated. For example, the selected signal from the digital switch 580 may be supplied to the modem module 571 to recover data from the signal. Similarly, the modem module 571 may supply a signal for transmission using the selected antenna.

Figure 9:
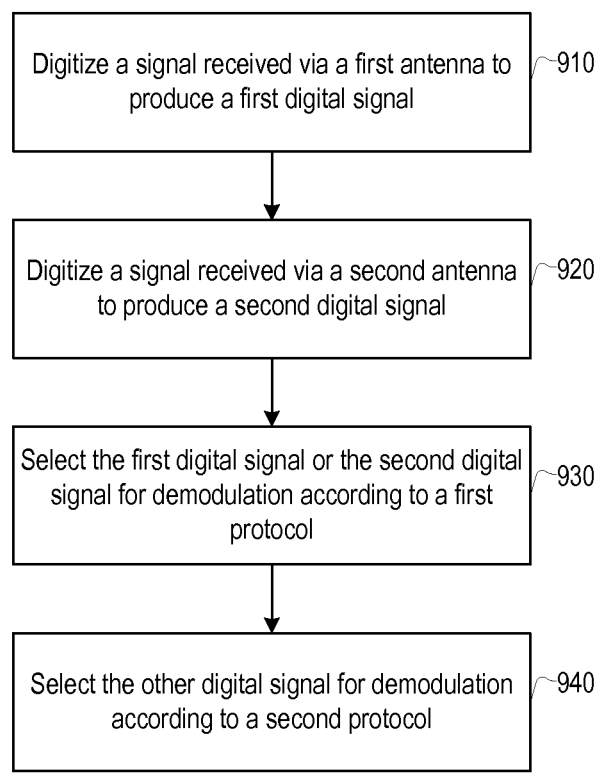
FIG. 9 a flowchart illustrating another method for antenna switching according to a presently disclosed embodiment.

FIG. 9 is a flowchart illustrating another method for antenna switching according to as presently disclosed embodiment. The method may be performed, for example, by one of the wireless terminals described above. To provide a specific example, aspects of the method will be described with reference to the wireless terminal of FIG. 2.

In step 910, a signal received via a first antenna is digitized to produce a first digital signal. For example, a signal received with the first antenna 201 may be digitized by the first ADC 261. Similarly, a transmit signal may be converted from digital to analog form for transmission via the first antenna.

In step 920, a signal received via a second antenna is digitized to produce a second digital signal. For example, a signal received with the second antenna 202 may be digitized by the second ADC 262. Similarly, another transmit signal may be converted from digital to analog form for transmission via the second antenna.

In step 930, a selection of the first digital signal or the second digital is performed and the selected signal is demodulated according to a first protocol. For example, the digital switch 280 may select the output of the first ADC 261 or the second ADC 262 and supply the selected signal to the first modem module 271 to recover data from the signal. Similarly, the digital switch 280 may supply a transmit signal from the first modem module 271 to the first DAC 263 or the second DAC 264.

In step 940, the signal not selected in step 930 (the second digital signal from the second ADC 262 if the first digital signal is selected in step 930 and the first digital signal from the first ADC 261 if the second digital signal is selected in step 930) is demodulated according to a second protocol. For example, the digital switch 280 may select the output of the first ADC 261 or the second ADC 262 and supply the selected signal to the second modem module 272 to recover data from the signal. Similarly, the digital switch 280 may supply another transmit, signal from the second modem module 272 to the first. DAC 263 or the second DAC 264.

Although particular embodiments are described above for, many variations are possible including those with different numbers of antennas and with different numbers of modems. Additionally, the received signals (coupled between modern and ADC) may be switched independently of the transmit signals (coupled between modem and DAC). For example, in an embodiment with a modem that receives and processes signals from two antennas, the transmit signal may be switched between using either of the two antennas.

Those of skill will appreciate that the various illustrative blocks and modules described in connection with the embodiments disclosed herein can be implemented in various forms. Some blocks and modules have been described above generally in terms of their functionality. How such functionality is implemented depends upon the design constraints imposed on an overall system. Skilled persons can implement the described functionality in varying ways for each particular application, but such implementation decisions should not be interpreted as causing a departure from the scope of the invention. In addition, the grouping of functions within a module, block, or step is for ease of description. Specific functions or steps can be moved from one module or block without departing from the invention.

Circuits implementing the embodiments and functional blocks and modules described herein can be realized using various transistor types, logic families, and design methodologies. The various illustrative blocks and modules described in connection with the embodiments disclosed, herein can be implemented in or with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein.

The above description of the disclosed embodiments is provided to enable any person skilled in the art to make or use the invention. Various modifications to these embodiments will be readily apparent to those skilled in the art, and the generic principles described herein can be applied to other embodiments without departing front the spirit or scope of the invention. Thus, it is to be understood that the description and drawings presented herein represent presently preferred embodiments of the invention and are therefore representative of the subject matter which is broadly contemplated by the present invention. It is further understood that the scope of the present invention fully encompasses other embodiments that may become obvious to those skilled, in the art and that the scope of the present invention is accordingly limited by nothing other than the appended claims.

What is claimed is:

1. A circuit for switching antennas in a wireless terminal, comprising:
   a first analog-to-digital converter configured to convert a first analog received signal to a first digital received signal;
   a second analog-to-digital converter configured to convert a second analog received signal to a second digital received signal;
   a first modem module configured to demodulate a first input signal and to modulate information to produce a first output signal;
   a first digital-to-analog converter configured to convert a first digital transmit signal to a first analog transmit signal;
   a second digital-to-analog converter configured to convert a second digital transmit signal to a second analog transmit signal; and
   a switch coupling the first analog-to-digital converter and the second analog-to-digital converter to the first modem module, and coupling the first digital-to-analog converter and the second digital-to-analog converter to the first modem module, and configured to select one of the first digital received signal and the second digital received signal and to supply the selected one of the first digital received signal and the second digital received signal to the first modem module as the first input signal in a first state and to supply the second digital received signal to the first modem module as the first input signal in a second state.

2. The circuit of claim 1, further comprising:
   a first radio-frequency (RF) receiver circuit coupled to a first antenna, the first RF receiver circuit configured to supply the first analog received signal; and
   a second RF receiver circuit coupled to a second antenna, the second RF receiver circuit configured to supply the second analog received signal.

3. The circuit of claim 1, further comprising:
   wherein the switch is further configured to supply the first output signal from the first modem module to the first digital-to-analog converter as the first digital transmit signal in the first state and to supply the first output signal from the first modem module to the second digital-to-analog converter as the second digital transmit signal in the second state.

4. The circuit of claim 1, further comprising a second modem module configured to demodulate a second input signal, and
   wherein the switch is further configured to supply the second digital received signal to the second modem module as the second input signal in the first state, and to supply the first digital received signal to the second modem module as the second input signal in the second state.

5. The circuit of claim 4, further comprising:
   wherein the second modem module is further configured to modulate information to produce a second output signal, and
   wherein the switch is further configured to supply the first output signal from the first modem module to the first digital-to-analog converter as the first digital transmit signal in the first state,
   supply the second output signal from the second modem module to the second digital-to-analog converter as the second digital transmit signal in the first state,
   supply the first output signal from the first modem module to the second digital-to-analog converter as the second digital transmit signal in the second state, and
   supply the second output signal from the second modem module to the first digital-to-analog converter as the first digital transmit signal in the second state.

6. The circuit of claim 5, further comprising:
   a first RF receiver circuit coupled to a first antenna, the first RF receiver circuit configured to supply the first analog received signal;
   a second RF receiver circuit coupled to a second antenna, the second RF receiver circuit configured to supply the second analog received signal;
   a first RF transmitter circuit coupled to the first antenna, the first RF transmitter circuit configured to receive the first analog transmit signal; and
   a second RF transmitter circuit coupled to the second antenna, the first RF transmitter circuit configured to receive the second analog transmit signal.

7. A method for switching antennas in a wireless terminal, comprising:
   digitizing, by a first analog-to-digital converter, a first analog received signal to produce a first digital received signal;
   digitizing, by a second analog-to-digital converter, a second analog received signal to produce a second digital received signal;
   switching from a first state to a second state, by a switch, the first digital received signal supplied by the digital switch to a first modem module as a first input signal in the first state, and the second digital received signal supplied by the switch to the first modem module as the first input signal in the second state, wherein the switch couples the first analog-to-digital converter and the second analog-to-digital converter to the first modem module and couples a first digital-to-analog converter and a second digital-to-analog converter to the first modem module;
   demodulating the first input signal by the first modem module; and modulating, by the first modem module, information to produce a first output signal; and converting, by the first digital-to-analog converter, the first output signal to a first analog transmit signal in the first state, and converting by the second digital-to-analog converter the first output signal to a second analog transmit signal in the second state.

8. The method of claim 7, further comprising:
receiving the first analog received signal via a first antenna; and
receiving the second analog received signal via a second antenna.

9. The method of claim 7, further comprising demodulating, by the first modem module, a second input signal, wherein the second digital received signal is supplied by the digital switch as the second input signal in the first state, and the first digital received signal is supplied by the digital switch as the second input signal in the second state.

10. The method of claim 9, further comprising:
modulating information, by a second modem module, to produce a second output signal; and
converting, the second output signal, to a second analog transmit signal by the second digital-to-analog converter in the first state, and converting the second output signal to the first analog transmit signal by the first digital-to-analog converter in the second state.

11. The method of claim 10, further comprising:
receiving the first analog received signal via a first antenna;
receiving the second analog received signal via a second antenna;
transmitting the first analog transmit signal via the first antenna; and
transmitting the second analog transmit signal via the second antenna.

12. A circuit for switching antennas in a wireless terminal, comprising:
means for converting a first analog received signal to a first digital received signal;
means for converting a second analog received signal to a second digital received signal;
means for demodulating a first input signal;
means for modulating information to produce a first output signal;
means for converting a first digital transmit signal to a first analog transmit signal;
means for converting a second digital transmit signal to a second analog transmit signal; and
means for switching between supplying the first digital received signal as the first input signal in a first state and supplying the second digital received signal as the first input signal in a second state, and wherein the means for switching couples the means for converting the first analog received signal and the means for converting the second analog received signal to the means for demodulating, and couples the means for converting the first digital transmit signal and the means for converting the second digital transmit signal to the means for demodulating.

13. The circuit of claim 12, further comprising:
a first radio-frequency (RF) receiver circuit coupled to a first antenna, the first RF receiver circuit configured to supply the first analog received signal; and
a second RF receiver circuit coupled to a second antenna, the second RF receiver circuit configured to supply the second analog received signal.

14. The circuit of claim 12, further comprising:
wherein the means for switching further supplies the first output signal as the first digital transmit signal in the first state and supplies the first output signal as the second digital transmit signal in the second state.

15. The circuit of claim 12, further comprising a means for demodulating a second input signal,
wherein the means for switching further supplies the second digital received signal as the second input signal in the first state and supplies the first digital received signal as the second input signal in the second state.

16. The circuit of claim 15, further comprising:
means for converting a first digital transmit signal to a first analog transmit signal;
means for converting a second digital transmit signal to a second analog transmit signal;
means for modulating information to produce a first output signal; and
means for modulating information to produce a second output signal,
wherein the means for switching further supplies the first output signal as the first digital transmit signal in the first state,
supplies the second output signal as the second digital transmit signal in the first state,
supplies the second output signal as the first digital transmit signal in the second state, and
supplies the first output signal as the second digital transmit signal in the second state.

17. The circuit of claim 16, further comprising:
a first radio-frequency (RF) receiver circuit coupled to a first antenna, the first RF receiver circuit configured to supply the first analog received signal;
a second RF receiver circuit coupled to a second antenna, the second RF receiver circuit configured to supply the second analog received signal;
a first RF transmitter circuit coupled to the first antenna, the first RF transmitter circuit configured to receive the first analog transmit signal; and
a second RF transmitter circuit coupled to the first antenna, the first RF transmitter circuit configured to receive the second analog transmit signal.

* * * * *